H. C. HERCHELRODE & J. E. SCHONACKER.
HORSE-HAY RAKE.
No. 192,332. Patented June 26, 1877.
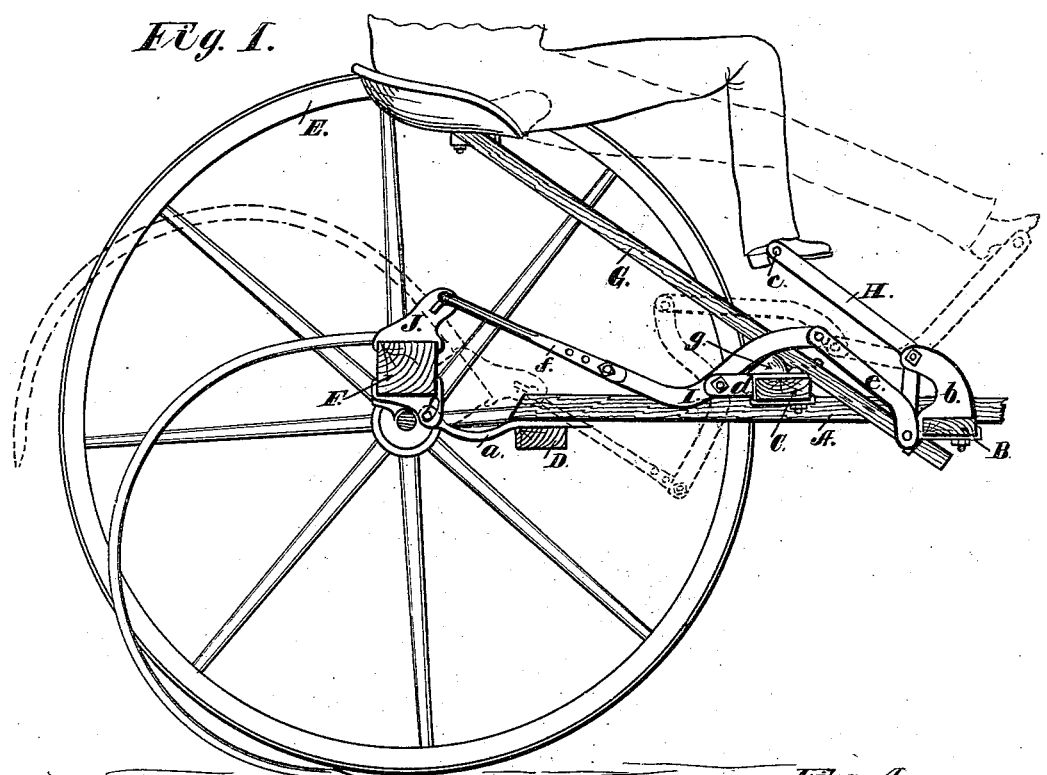
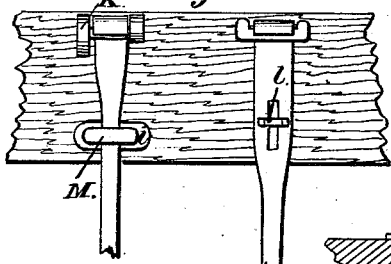
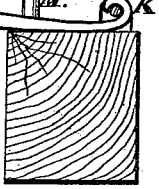
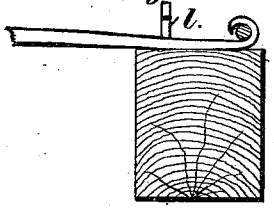
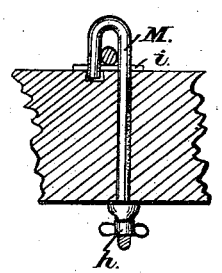
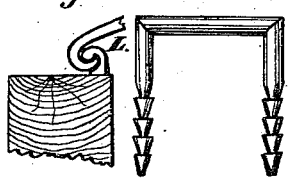
Witnesses:
Chas. M. Peck
Leo Greulich
Inventors:
Henry C. Herchelrode
John E. Schonacker
by their Attys
Peck & Co.

UNITED STATES PATENT OFFICE.

HENRY C. HERCHELRODE AND JOHN E. SCHONACKER, OF DAYTON, OHIO.

IMPROVEMENT IN HORSE HAY-RAKES.

Specification forming part of Letters Patent No. 192,332, dated June 26, 1877; application filed May 19, 1877.

*To all whom it may concern:*

Be it known that we, HENRY C. HERCHELRODE and JOHN E. SCHONACKER, of Dayton, in the county of Montgomery and State of Ohio, have invented certain new and useful Improvements in Horse Hay-Rakes; and we do hereby declare the following to be a full, clear, and exact description of the same.

This invention relates to that class of horse hay-rakes in which the teeth can be raised to discharge the collected hay by the pressure of the driver's foot upon a properly constructed and arranged lever.

Our improvements consist in the construction and arrangement of the dumping-levers, whereby the driver can, by the pressure of his foot on a stirrup, either hold the teeth down to raking position or cause them to be elevated to discharge the collected hay, at his pleasure.

To enable others skilled in the art to which our invention appertains to make and use the same, we would thus proceed to describe it, referring to the accompanying drawing, in which—

Figure 1 is a side elevation of our improved rake, with a wheel and thill removed to clearly exhibit the operating devices. Figs. 2, 3, 4, 5, and 7 are detail views of the tooth-fastening devices, to be referred to hereinafter. Fig. 6 represents a thill-staple.

The frame-work of our rake is of the ordinary construction, consisting of the thills A, braced by the cross-bars B, C, and D, the carriage-wheels E, rake-head or axle F, and seat-beam G, occupying its usual position. The thills are hinged to the axle by straps $a$ of any suitable construction. Upon the cross-beam B, about half-way between the thills and to the right of the seat-beam, is secured by a bolt the bearing-piece $b$, of the shape represented. In the top of this bearing, which is elevated a little above the plane of the shafts, is pivoted a bell-crank lever, H, provided at the top with a laterally-projecting pin or stirrup, $c$. On the cross-beam C, in a line with the bearing $b$, is secured in any suitable manner a bearing-piece, $d$, of the shape represented, that extends rearwardly from the beam. To this bearing is pivoted a second bell-crank lever, I, of the shape shown.

A metal link or strip, $e$, connects the lower end of the lever H to the forward end of the lever I, and a link, $f$, of any suitable construction, unites the rear end of the lever I to the bearing-piece or "goose-neck" J, secured upon the rake-head. The driver occupies his usual position upon the rake-seat, and places his foot upon the stirrup $c$, as indicated. By a downward pressure of the foot, the teeth are held to raking position until a load is collected, when, by straightening the leg, as indicated by the dotted lines, the lever H is thrown forward and causes the head to rotate and the teeth to be elevated. This discharge of the rake, owing to the arrangement of the bell-crank levers, is effected with a very little expenditure of force, so that a lad can operate the rake as easily as a man, and at the same time both hands of the driver are free to manage the horse. A stop, $g$, forming part of the bearing $d$, limits the downward movement of the lever I, as represented.

The tooth-fastening devices consist in flattening the heels of the rake-teeth, and bending them into hooks, as seen in Figs. 3 and 4. Staples of the shape represented in top view at K, Fig. 2, and in side elevation at L, Fig. 7, are driven equidistantly into the top forward part of the rake-head, and the hooked ends of the teeth are slipped sidewise, in the position shown in Fig. 7, over the top bar of the staples, and brought down to their usual position. To prevent lateral play, and at the same time to provide what are known as "drop-teeth," we employ staples M, of the shape represented in Fig. 5, which pass entirely through the head, and are clamped by thumb-nuts $h$. These staples pass through washers $i$ that rest upon the rake-head, and they are arranged seriatim upon the rear edge of the head, as shown in Fig. 2. The teeth are passed through them seriatim, whereby a lateral motion is prevented, though they may have slight vertical play.

When it is desired to remove a tooth for any cause, it is only necessary to unscrew the thumb-nut $h$ until the staple can be raised and its shorter end turned over the tooth, thereby freeing it.

Instead of the staple just referred to, a pin or key, $l$, can be inserted into the head through a slot in the flattened portion of the tooth, as seen in Figs. 2 and 4.

Having thus fully described our invention, what we claim as new, and desire to secure by Letters Patent, is—

The bell-crank levers H and I, pivoted upon the cross-bars B and C, and connected to each other and to the rake-head by the links $e$ and $f$, whereby the driver can, by the pressure of his foot, hold the teeth to raking position, or cause them to be elevated to discharge the collected hay, substantially as set forth.

Witness our hand this 15th day of May, A. D. 1877.

HENRY C. HERCHELRODE.
JOHN E. SCHONACKER.

Witnesses:
CHAS. M. PECK,
PATRICK H. GUNCKEL.